US007909594B2

(12) United States Patent
Kock

(10) Patent No.: US 7,909,594 B2
(45) Date of Patent: Mar. 22, 2011

(54) MACHINE FOR PROCESSING RESIDUAL MATERIAL

(75) Inventor: Bernhard Kock, Moers (DE)

(73) Assignee: Metso Lindemann GmbH (DE)

( * ) Notice: Subject to any disclaimer, the term of this patent is extended or adjusted under 35 U.S.C. 154(b) by 435 days.

(21) Appl. No.: 12/054,521

(22) Filed: Mar. 25, 2008

(65) Prior Publication Data

US 2008/0274221 A1 Nov. 6, 2008

(30) Foreign Application Priority Data

May 5, 2007 (DE) ........................ 10 2007 021 208

(51) Int. Cl.
*B29C 33/60* (2006.01)

(52) U.S. Cl. ....... 425/107; 425/355; 425/412; 184/6.14; 184/71

(58) Field of Classification Search .................... 425/78, 425/107, 344-353, 412-416; 184/71, 6.1-6.26
See application file for complete search history.

(56) References Cited

U.S. PATENT DOCUMENTS

| | | | | | |
|---|---|---|---|---|---|
| 3,767,012 | A | * | 10/1973 | Jimi et al. | 425/107 |
| 3,857,363 | A | * | 12/1974 | Ferlito | 425/78 |
| 5,076,343 | A | * | 12/1991 | Sandercock | 164/267 |
| 5,272,901 | A | * | 12/1993 | Cudzik | 184/6.14 |

FOREIGN PATENT DOCUMENTS

| | | |
|---|---|---|
| AT | 166489 | 1/1950 |
| DE | 19804789 | 8/1999 |

* cited by examiner

*Primary Examiner* — Richard Crispino
*Assistant Examiner* — Thu Khanh T Nguyen
(74) *Attorney, Agent, or Firm* — Kusner & Jaffe

(57) ABSTRACT

The invention relates to a machine for processing residual material, comprising at least one actuator which acts mechanically upon the residual material and at least a portion of the surface of which is movable relative to a corresponding surface of an adjacent component of the machine.

4 Claims, 1 Drawing Sheet

MACHINE FOR PROCESSING RESIDUAL MATERIAL

FIELD OF THE INVENTION

The invention relates to a machine for processing residual material, comprising at least one actuator which acts mechanically upon the residual material and at least a portion of the surface of which is movable relative to a corresponding surface of an adjacent component of the machine.

BACKGROUND OF THE INVENTION

Such a machine is, for example, a press, a shearing machine, a size-reduction unit or the like, for the preparation of residual metals or other residual materials. The prior art and the invention are explained more fully in the following with reference to the example of a scrap baling press, without limitation of the invention to this extent.

The movable parts of a machine of the aforementioned type are usually activated hydraulically. This applies equally to pressing rams and to shearing blades, or to other actuators that are driven in a rotatory or linear manner and act mechanically upon the residual material.

The components of the machine that are moved relative to one another (or onto one another) are usually lubricated with a lubricant such as oil, in order to reduce friction, wear and maintenance. The lubricating oil is supplied from a lubricating-oil container to the location(s) to be lubricated, if necessary via a lubricating-oil distributor. It is usual for an associated lubricant line to be disposed in the static component. The component that slides past the latter causes the lubricant to be distributed, but usually in a non-uniform, non-reproducible manner.

SUMMARY OF THE INVENTION

The invention is based on the object of improving the lubrication of a machine for processing residual material. The concept according to the invention is based on the following considerations:

- The lubrication can be optimized if the lubricant comes out in the surface region of the moving parts. The lubricant can thereby be brought to specific, defined lubricant points (lubricant faces).
- The distribution of the lubricant between two components that move relative to each other, or between a moving and a static component, is more precise is the supply of lubricant is effected via the (a) moving component.
- A plurality of lubricant lines can be connected fluidically to a common lubricant distributor. Individual lubricant lines, groups of lubricant lines or all lubricant lines can thus be controlled in an open-loop/closed-loop manner by the lubricant distributor in respect of time, quantity, pressure of the lubricant supply and/or the lubricant delivery location.
- The aforementioned measures enable defined parts of the machine to be supplied with defined quantities of lubricant at defined points in time.
- The measures described also allow the creation of lubricant patterns, which render possible improved lubrication.

Accordingly, the invention, in its most general embodiment, relates to a machine for processing residual material, comprising at least one actuator which acts mechanically upon the residual material and at least a portion of a surface of which is movable relative to a corresponding surface of an adjacent component of the machine, the actuator having at least one lubricant distributor, from which there extend a plurality of lubricant lines which terminate, at a distance from each other, in the surface of the actuator.

The term actuator comprises all movable parts of the machine that act mechanically upon the residual material. It includes, in particular, hydraulic rams of presses, hydraulically moved blades of industrial shearing machines, etc.

In the case of a scrap baling press, the actuator can be a pressing ram which can be moved back and forth in a pressing box, as explained more fully by the following description of the figures.

The actuator can also be movable in a rotatory manner relative to the adjacent component.

It is a particular advantage of the solution according to the invention that individual lubricant lines or groups of lubricant lines can be supplied with lubricating oil in a preselectable manner. Differing locations can thereby be provided with differing (or the same) quantities of lubricating oil at differing times for the purpose of lubrication.

The lubricant can be delivered at differing pressures. The lubricant can be routed, in differing quantities, through one or more lubricant lines. Alternatively, the supply of lubricant can also be activated at differing times, in order to deliver the lubricant to defined locations between a moving and a static part.

Open-loop and closed-loop control measures can be so designed that specific lubricating profiles are selected for specific applications.

The lubricant lines are usually narrow channels of any cross-section, mostly of a round cross-section. Depending on the particular application, however, at least the outlet region of the lubricant line, in the region of the surface of the actuator, can also have other cross-sectional geometries, for example that of a circle, rectangle, triangle, an involute, a polygon, or an oval.

The cross-sectional areas of the lubricant lines and, in particular, of the apertures in the surface of the actuator, are selected according to the particular application. They are usually in the region of some mm.

BRIEF DESCRIPTION OF THE DRAWINGS

In the case of the exemplary embodiment explained in the following description of the figures, the following is represented.

DETAILED DESCRIPTION OF PREFERRED EMBODIMENTS

The following description of the figures is based on the schematic representation. Since the components are known per se, only those features which are essential to the invention are described more fully.

Figure 1:
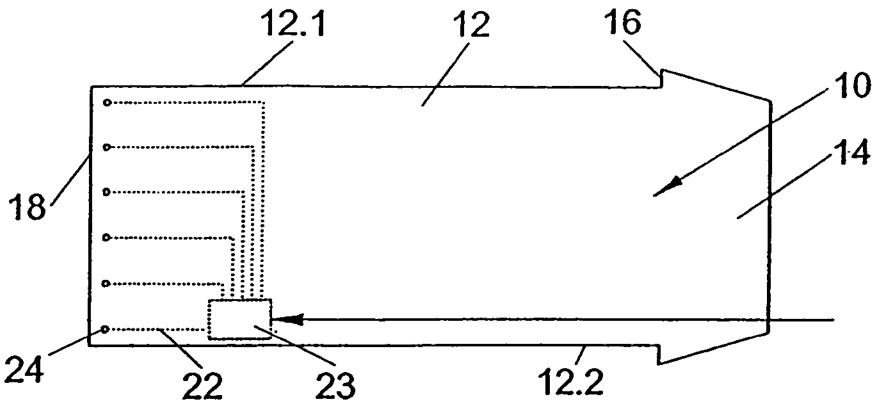
FIG. 1: a top view of a pressing ram of a scrap baling press.
Figure 2:
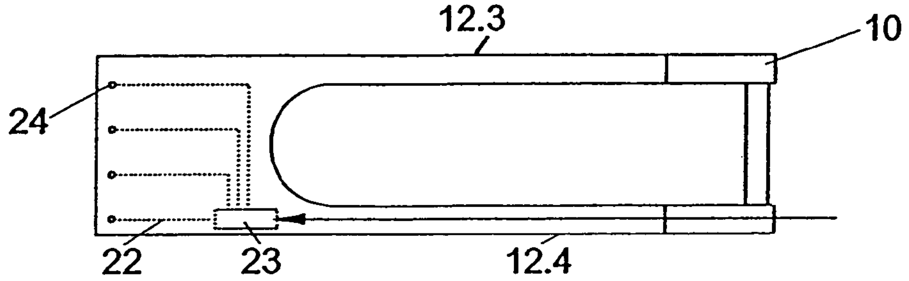
FIG. 2: a side view of the pressing ram according to FIG. 1.

Represented in FIG. 1, having the reference 10, is a pressing ram of a scrap baling press. The pressing ram 10 has a body 12, a head 14 with stops 16 and, at the opposite end, a pressing face 18. Since the body 12 has the approximate form of a rectangular parallelepiped, the body 12 comprises, in addition to the head 14 and the pressing face 18, four surfaces 12.1 . . . 12.4.

Disposed in the body 12 (which is made of steel) is a lubricant distributor 23, into which there opens a delivery line (not represented) for lubricating oil (represented schematically by an arrow).

From the lubricant distributor 23, a total of six lubricant lines 22 extend to differing locations in the region of the surfaces 12.1, 12.2, 12.4 of the body 12. Each lubricant line 22 terminates at an outlet aperture, which is denoted as a "lubricant point" 24.

Figure 3:
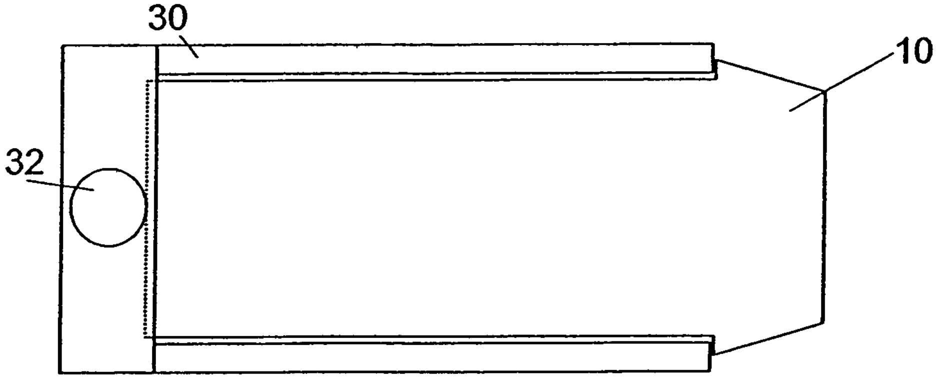
FIG. 3: a top view according to FIG. 1, with associated pressing box.

FIG. 3 shows the pressing ram 10 fully inserted in an associated pressing box 30. A further actuator of the scrap baling press, acting perpendicularly relative to the plane of the drawing, is represented schematically at the reference 32.

Figure 4:
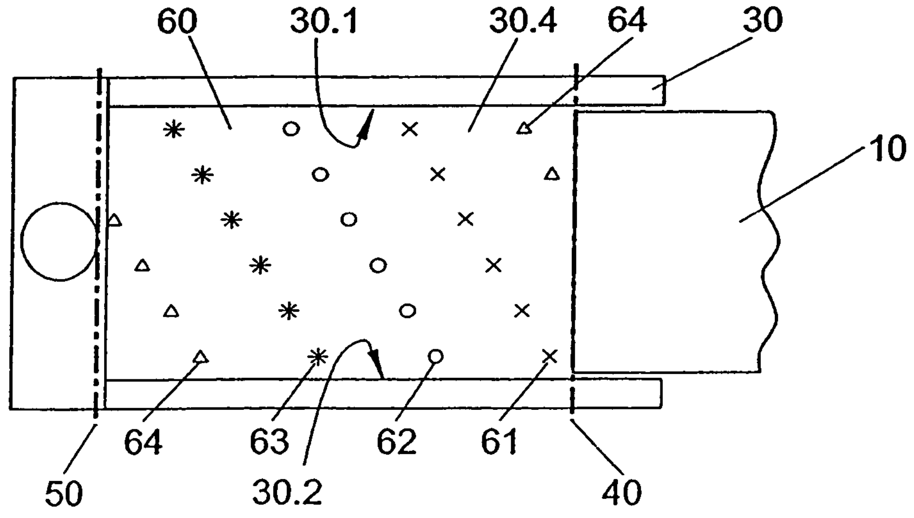
FIG. 4: a top view, analogous to FIG. 3, with retracted pressing ram.

The position of the pressing ram 10 according to FIG. 3 is represented in FIG. 4 by the line 50. A retracted position of the pressing ram 10 is indicated by the line 40. The pressing ram 10 moves back and forth in the region between 40 and 50, with its surfaces 12.1, 12.2 and 12.4 sliding along corresponding faces 30.1, 30.2, 30.4 of the pressing box 30.

According to a preselectable program, lubricating oil is fed into the lubricant distributor 23, and from there into the lubricant lines 22, and is brought, via the lubricant points 24, into the region between corresponding face portions (12.1, 30.1; 12.2, 30.2; 12.4, 30.4) of the actuator and pressing box, respectively.

In the exemplary embodiment represented, lubricant has been supplied, via the individual lubricant lines 22, at differing points in time during the course of movement of the pressing ram 10. As a result, the locations denoted by 61, 62, 63 and 64 have been supplied with lubricant, and the correspondingly represented lubricant pattern (formed from the individual lubricant points) has been generated.

Accordingly, an essential aspect of the invention consists in that, at differing times and at differing locations, preselectable quantities of lubricant are brought to the desired locations, via the lubricant lines 22, for the purpose of generating a lubricant profile optimized for the respective application.

The invention claimed is:

1. A residual material processing machine, comprising:

a) at least one actuator (10) which acts mechanically upon the residual material, wherein the actuator (10) having at least one surface (12.1 . . . 12.4), and b) a component (30) disposed adjacent to said actuator (10), said component (30) having a corresponding surface (30.1 . . . 30.4), wherein the at least one surface (12.1 . . . 12.4) of the at least one actuator (10) being movable relative to and onto the corresponding surface (30.1 . . . 30.4) of the component (30), c) the actuator (10) having at least one lubricant distributor (23), from which there extend a plurality of lubricant lines (22) which terminate, at a distance from each other, in the at least one surface (12.1 . . . 12.4) of the actuator (10), wherein d) individual lubricant lines (22) or groups of lubricant lines (22) or all lubricant lines are independently controlled in an open or closed loop manner by the lubricant distributor in respect of at least one of time, quantity, pressure of the lubricant or lubricant delivery location.

2. Machine according to claim 1, wherein the actuator (10) is a pressing ram and the adjacent component (30) is a pressing box.

3. Machine according to claim 1, wherein the actuator (10) can be moved in a linear manner relative to the adjacent component (30).

4. Machine according to claim 1, wherein the lubricant distributor (23) is fluidly connectable to lubricant lines (22).

* * * * *